United States Patent
Takahara

(10) Patent No.: US 10,225,451 B2
(45) Date of Patent: Mar. 5, 2019

(54) IMAGING APPARATUS HAVING A FOCUS ADJUSTMENT APPARATUS

(71) Applicant: NIKON CORPORATION, Tokyo (JP)

(72) Inventor: Hiroaki Takahara, Matsudo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/193,232

(22) Filed: Feb. 28, 2014

(65) Prior Publication Data

US 2014/0240585 A1 Aug. 28, 2014

Related U.S. Application Data

(63) Continuation of application No. PCT/JP2012/067849, filed on Jul. 12, 2012.

(Continued)

(30) Foreign Application Priority Data

Sep. 8, 2011 (JP) .................................. 2011-195754

(51) Int. Cl.
G02B 7/34 (2006.01)
G03B 13/36 (2006.01)
(Continued)

(52) U.S. Cl.
CPC .............. *H04N 5/232* (2013.01); *G02B 7/34* (2013.01); *H04N 5/238* (2013.01);
(Continued)

(58) Field of Classification Search
CPC .... H04N 5/232; H04N 5/23212; H04N 5/238; H04N 5/2353; H04N 5/23209;
(Continued)

(56) References Cited

U.S. PATENT DOCUMENTS 4,933,700 A 6/1990 Ikeda et al.
5,892,987 A * 4/1999 Ohmori .................... G03B 7/16
396/61

(Continued)

FOREIGN PATENT DOCUMENTS

CN 101841656 A 9/2010
JP H02-37316 A 2/1990
(Continued)

OTHER PUBLICATIONS

Oct. 16, 2012 International Search Report issued in International Application No. PCT/JP2012/067849 (with translation).
(Continued)

*Primary Examiner* — Pritham D Prabhakher
(74) *Attorney, Agent, or Firm* — Oliff PLC

(57) ABSTRACT

An imaging apparatus is provided which comprises: an imaging unit 22 that captures an image through an optical system and outputs an image signal corresponding to the captured image; a focus detection unit 21 that uses the image signal as the basis to detect a focal state of the optical system at a plurality of focus detection positions set in an image plane of the optical system; a calculation unit 21 that calculates a limit value at a closing side of an aperture value of the optical system as a closing side limit value, the limit value corresponding to a focus detection position when the focus detection unit 21 performs focus detection; and a control unit 21 that, when the focus detection unit 21 performs focus detection, sets the aperture value of the optical system on the basis of the closing side limit value corresponding to the focus detection position for performing focus detection.

10 Claims, 11 Drawing Sheets

Related U.S. Application Data

(60) Provisional application No. 61/587,306, filed on Jan. 17, 2012.

(51) Int. Cl.
*H04N 5/232* (2006.01)
*H04N 5/235* (2006.01)
*H04N 5/238* (2006.01)
*H04N 5/357* (2011.01)
*H04N 5/369* (2011.01)

(52) U.S. Cl.
CPC ....... *H04N 5/2353* (2013.01); *H04N 5/23212* (2013.01); *G03B 13/36* (2013.01); *H04N 5/23209* (2013.01); *H04N 5/23219* (2013.01); *H04N 5/3572* (2013.01); *H04N 5/3696* (2013.01)

(58) Field of Classification Search
CPC ............. H04N 5/23219; H04N 5/3572; H04N 5/3696; G02B 7/34; G03B 13/36
USPC .......................................................... 348/345
See application file for complete search history.

(56) References Cited

U.S. PATENT DOCUMENTS

| | | | | |
|---|---|---|---|---|
| 7,469,099 B2* | 12/2008 | Terayama | ............. | G03B 13/34 250/201.2 |
| 7,627,239 B2* | 12/2009 | Terayama | ............. | G03B 13/34 250/201.2 |
| 7,787,020 B2* | 8/2010 | Watanabe | .......... | H04N 5/23212 348/221.1 |
| 7,995,138 B2* | 8/2011 | Yamazaki | .......... | H04N 5/23212 348/221.1 |
| 8,553,133 B2* | 10/2013 | Inoue | ................. | H04N 5/23219 348/345 |
| 2005/0001924 A1* | 1/2005 | Honda | ............... | H04N 5/23212 348/348 |
| 2008/0030594 A1* | 2/2008 | Terada | .................... | G03B 3/00 348/221.1 |
| 2008/0049117 A1* | 2/2008 | Watanabe | .......... | H04N 5/23212 348/222.1 |
| 2008/0252773 A1* | 10/2008 | Oishi | .................... | G03B 13/32 348/347 |
| 2009/0074395 A1* | 3/2009 | Terayama | ............. | G03B 13/34 396/123 |
| 2009/0115887 A1* | 5/2009 | Sugimoto | ............. | G03B 13/32 348/349 |
| 2010/0054722 A1* | 3/2010 | Endo | ...................... | G03B 13/00 396/98 |
| 2010/0086293 A1* | 4/2010 | Iwane | ..................... | G03B 3/00 396/91 |
| 2010/0238343 A1 | 9/2010 | Kawarada | | |
| 2011/0050981 A1* | 3/2011 | Inoue | ................. | H04N 5/23212 348/345 |
| 2011/0052173 A1* | 3/2011 | Yoshida | .................. | G03B 7/08 396/213 |
| 2011/0194018 A1* | 8/2011 | Kosaka | .................. | G03B 13/36 348/349 |
| 2011/0267533 A1* | 11/2011 | Hirose | ............... | H04N 5/23212 348/345 |
| 2011/0285899 A1 | 11/2011 | Hirose | | |

FOREIGN PATENT DOCUMENTS

| | | |
|---|---|---|
| JP | 2757379 B2 | 5/1998 |
| JP | 2008-096796 A | 4/2008 |
| JP | A-2010-217618 | 9/2010 |
| JP | 2011-035718 A | 2/2011 |
| JP | 2011-101325 A | 5/2011 |
| WO | 2010/90056 A1 | 8/2010 |

OTHER PUBLICATIONS

Apr. 18, 2016 Office Action issued in Chinese Patent Application No. 201280054738.5.
Aug. 11, 2015 Office Action issued in Japanese Application No. 2011-195754.
Mar. 7, 2017 Office Action Issued in Chinese Patent Application No. 201280054738.5.
Aug. 28, 2017 Office Action Issued in Chinese Patent Application No. 201280054738.5.

* cited by examiner (A)

(B)

IMAGING APPARATUS HAVING A FOCUS ADJUSTMENT APPARATUS

BACKGROUND OF THE INVENTION

1. Field of the Invention

The present invention relates to an imaging apparatus.

2. Description of the Related Art

An imaging apparatus has been heretofore known which uses the output from focus detection pixels provided at an imaging device as the basis to detect the shift amount of an image plane through an optical system and thereby detects a focal state of the optical system. In such an imaging apparatus, to prevent the occurrence of vignetting at the time of performing focus detection, there is known a method of performing focus detection while setting the aperture value of the optical system at a value smaller (more opening side) than a predetermined aperture value (e.g., Patent Literature 1: JP2010-217618A).

Patent Literature 1: JP2010-217618A

SUMMARY OF THE INVENTION

According to the prior art, however, when changing the aperture value of the optical system from the aperture value at the time of focus detection to an imaging aperture value to actually capture an image, the change of the aperture value may lead to movement of the image plane of the optical system, so that an image focused on the object may not be captured.

Objects of the present invention include providing an imaging apparatus which can capture an image well.

The present invention provides the following means to achieve the above objects.

According to a first aspect of the present invention, there is provided an imaging apparatus comprising: an imaging unit that captures an image through an optical system and outputs an image signal corresponding to the captured image; a focus detection unit that uses the image signal as the basis to detect a focal state of the optical system at a plurality of focus detection positions set in an image plane of the optical system; a calculation unit that calculates a limit value at a closing side of an aperture value of the optical system as a closing side limit value, the limit value corresponding to a focus detection position when the focus detection unit performs focus detection; and a control unit that, when the focus detection unit performs focus detection, sets the aperture value of the optical system on the basis of the closing side limit value corresponding to the focus detection position for performing focus detection.

According to a second aspect of the present invention, there is provided an imaging apparatus comprising: an imaging unit that captures an image through an optical system and outputs an image signal corresponding to the captured image; a focus detection unit that uses the image signal as the basis to detect a focal state of the optical system; a calculation unit that calculates a limit value at a closing side of an aperture value of the optical system as a closing side limit value, the limit value corresponding to a position of an exit pupil of the optical system when the focus detection unit performs focus detection; and a control unit that, when the focus detection unit performs focus detection, sets the aperture value of the optical system on the basis of the closing side limit value corresponding to the position of the exit pupil of the optical system.

The above imaging apparatus according to the present invention may be configured such that: the calculation unit calculates a limit value at the closing side of the aperture value of the optical system as a closing side limit value, the limit value corresponding to the focus detection position and a position of an exit pupil of the optical system when the focus detection unit performs focus detection; and the control unit, when the focus detection unit performs focus detection, sets the aperture value of the optical system on the basis of the closing side limit value corresponding to the focus detection position for performing focus detection and the position of the exit pupil of the optical system.

The above imaging apparatus according to the present invention may be configured such that the control unit, when the focus detection unit performs focus detection, sets the aperture value of the optical system to the same value as the closing side limit value or a value at an opening side from the closing side limit value.

The above imaging apparatus according to the present invention may be configured such that the control unit sets the aperture value of the optical system when the focus detection unit performs focus detection to an imaging aperture value when capturing an image or a value at an opening side from the imaging aperture value.

The above imaging apparatus according to the present invention may be configured such that the control unit sets the aperture value of the optical system when the focus detection unit performs focus detection to a value at the closing side from an open aperture value of the optical system.

The above imaging apparatus according to the present invention may be configured such that the control unit, if an imaging aperture value when capturing an image is a value at the closing side from the closing side limit value, sets the aperture value of the optical system when the focus detection unit performs focus detection to the closing side limit value.

The above imaging apparatus according to the present invention may be configured such that: the imaging unit has a plurality of imaging pixels arranged two dimensionally and a plurality of focus detection pixels arranged one dimensionally or two dimensionally to be mixed with the imaging pixels; and the focus detection unit is capable of performing focus detection using at least one of a phase difference detection system and a contrast detection system, the phase difference detection system being such that the image signal output from each of the focus detection pixels is used as the basis to detect a shift amount of an image plane by the optical system thereby to detect a focal state of the optical system, the contrast detection system being such that the image signal output from each of the imaging pixels is used as the basis to calculate an evaluation value with regard to contrast of an image by the optical system and the calculated evaluation value is used as the basis to detect a focal state of the optical system.

The above imaging apparatus according to the present invention may be configured to further comprise an acquisition unit that acquires an opening side limit value from a lens barrel, the opening side limit value being a limit value at an opening side of the aperture value of the optical system when the focus detection unit performs focus detection, wherein the control unit, when the focus detection unit performs focus detection, may set the aperture value of the optical system within a range between the opening side limit value and the closing side limit value.

The above imaging apparatus according to the present invention may be configured such that the control unit, if an imaging aperture value when capturing an image is a value at the opening side from the opening side limit value, sets the aperture value of the optical system when the focus detection unit performs focus detection to the imaging aperture value.

The above imaging apparatus according to the present invention may be configured such that the control unit, if an imaging aperture value when capturing an image is a value at the closing side from the closing side limit value, sets the aperture value of the optical system when the focus detection unit performs focus detection within a range between the opening side limit value and the closing side limit value, or, if the imaging aperture value is the same value as the closing side limit value or a value at the opening side from the closing side limit value, sets the aperture value of the optical system when the focus detection unit performs focus detection within a range between the opening side limit value and the imaging aperture value.

According to the present invention, an image can be captured well.

BRIEF DESCRIPTION OF THE DRAWINGS

FIG. 5(A) is a front elevational view showing enlarged one of the focus detection pixels 222a, while FIG. 5(B) is a front elevational view showing enlarged one of the focus detection pixels 222b;

FIG. 7(A) is a cross-sectional view showing enlarged one of the focus detection pixels 222a, while FIG. 7(B) is a cross-sectional view showing enlarged one of the focus detection pixels 222b;

DESCRIPTION OF THE PREFERRED EMBODIMENTS

Embodiments of the present invention will hereinafter be described with reference to the drawings.

Figure 1:
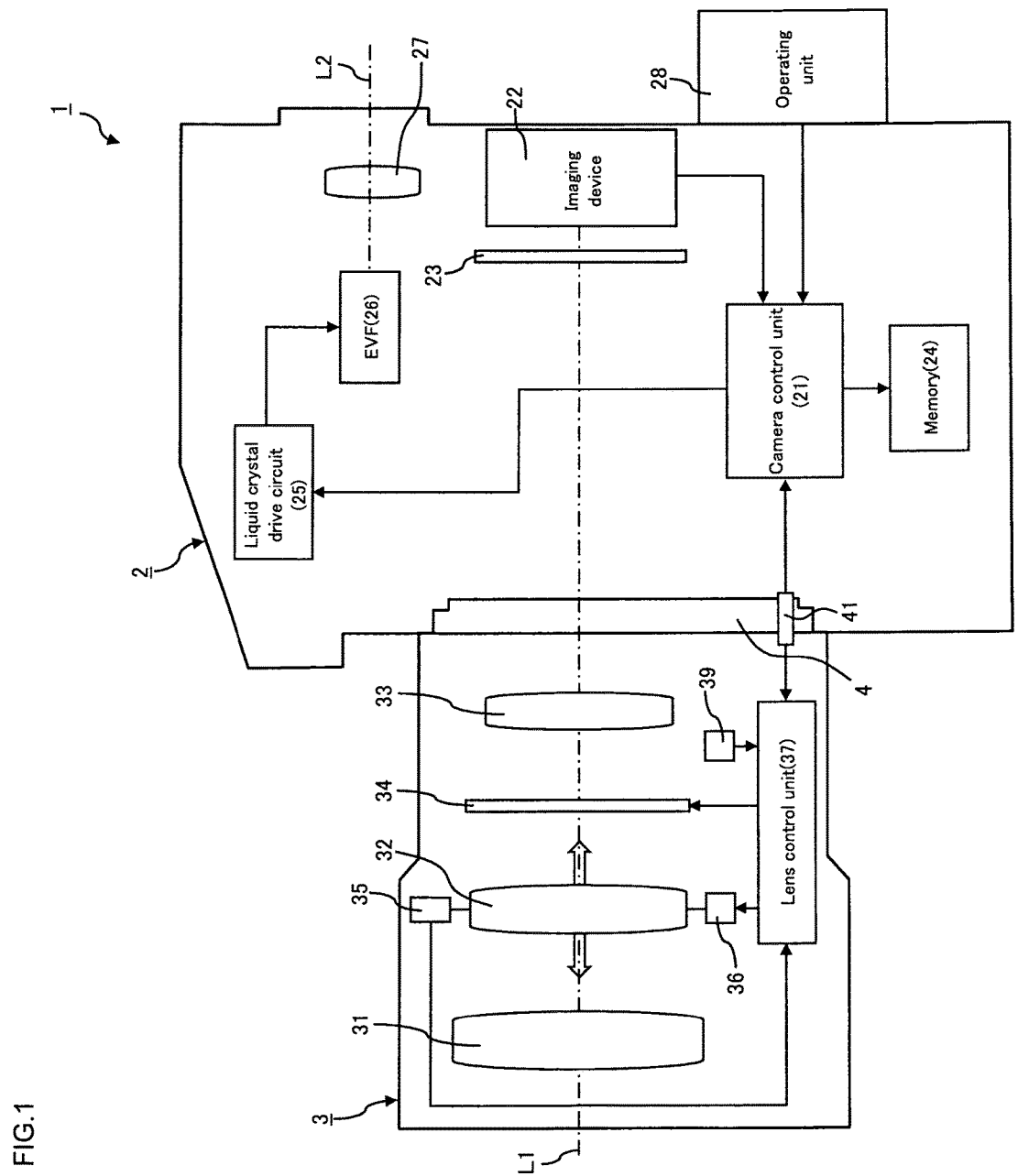
FIG. 1 is a block diagram showing a camera according to an embodiment of the present invention.

FIG. 1 is a view of the principal configuration which shows a digital camera 1 according to an embodiment of the present invention. The digital camera 1 according to the present embodiment (referred simply to as "camera 1", hereinafter) is configured of a camera body 2 and a lens barrel 3, which are connected with each other in a detachable manner using a mount unit 4.

The lens barrel 3 is an interchangeable lens which can be detachably attached to the camera body 2. As shown in FIG. 1, the lens barrel 3 is provided therein with an imaging optical system which includes lenses 31, 32 and 33 and an aperture 34.

The lens 32 is a focus lens, which can be moved in the optical axis L1 direction thereby to allow the focal distance of the imaging optical system to be adjusted. The focus lens 32 is provided so as to be movable along the optical axis L1 of the lens barrel 3, and the position of the focus lens 32 may be adjusted by a focus lens drive motor 36 while being detected by an encoder 35.

The specific configuration of the movement mechanism for the focus lens 32 along the optical axis L1 is not particularly limited. As one example, a rotating barrel is inserted in a rotatable manner inside a fixed barrel fixed to the lens barrel 3. The inner circumferential surface of this rotating barrel is formed with a helicoid groove (spiral groove). The end of a lens frame to which the focus lens 32 is fixed is engaged with the helicoid groove. The focus lens drive motor 36 is used to rotate the rotating barrel, so that the focus lens 32 fixed to the lens frame moves straight along the optical axis L1.

As described above, by rotating the rotating barrel with respect to the lens barrel 3, the focus lens 32 fixed to the lens frame moves straight in the optical axis L1 direction. The focus lens drive motor 36 as a drive source for the above movement is provided in the lens barrel 3. The focus lens drive motor 36 and the rotating barrel are, for example, coupled via a transmission that comprises a plurality of gears. If the drive shaft of the focus lens drive motor 36 is driven to rotate to either direction, then this driving force will be transmitted to the rotating barrel by a predetermined gear ratio to drive it in either direction, thereby moving the focus lens 32 fixed to the lens frame straight in a certain direction along the optical axis L1. If, on the other hand, the drive shaft of the focus lens drive motor 36 is driven to rotate in the opposite direction, then the gears of the transmission also rotate in the opposite directions, and the focus lens 32 will move straight in the opposite direction along the optical axis L1.

The position of the focus lens 32 is detected by the encoder 35. As already described, the position in the optical axis L1 direction of the focus lens 32 is correlated with the rotational angle of the rotating barrel, and can thus be determined by detecting the relative rotational angle of the rotating barrel with respect to the lens barrel 3, for example.

As the encoder 35 in the present embodiment, it is possible to use one which detects rotation of a rotary disk coupled with the rotational drive of the rotating barrel by a photo sensor such as a photo interrupter so as to output a pulse signal corresponding to the rotational speed, or one which brings an encoder pattern on the surface of a flexible printed circuit board provided at either one of the fixed barrel and the rotating barrel into contact with a brush contact which is provided at the other and detects the change in the contact position corresponding to the amount of movement of the rotating barrel (either in the rotational direction or optical axis direction) by a detection circuit, etc.

The focus lens 32 can be moved by rotation of the above-described rotating barrel from the end at the camera body side (referred also to as "near end") to the end at the object side (referred also to as "infinite end") in the optical axis L1 direction. Information on the current position of the focus lens 32 detected by the encoder 35 is sent through the lens control unit 37 to a camera control unit 21 as will be described later. This information is used as the basis to calculate a drive position of the focus lens 32, which is sent from the camera control unit 21 through the lens control unit 37 thereby to drive the focus lens drive motor 36.

The aperture 34 is configured such that the aperture size centered on the optical axis L1 can be adjusted in order to restrict the amount of light beams which pass through the above imaging optical system and reach an imaging device 22 and to adjust the amount of blurring. The adjustment of the size of the aperture 34 is performed using an aperture size, which corresponds to an aperture value calculated in the automatic exposure mode, being sent from the camera control unit 21 through the lens control unit 37, for example. In addition, an aperture size, which corresponds to an imaging aperture value set in the manual operation using the operating unit 28 provided at the camera body 2, is input from the camera control unit 21 to the lens control unit 37. The aperture size of the aperture 34 is detected by an aperture sensor not shown, and the lens control unit 37 recognizes the current aperture size.

According to the present embodiment, the lens control unit 37 preliminarily stores in a memory 39 the limit value at the opening side of the aperture value of the optical system at the time of detection of the focal state of the optical system as an opening side limit value. Here, for example, provided that the aperture value at the time of detection of the focal state of the optical system is set at F1.4 and the imaging aperture value at the time of actually capturing an image is set at F2.8, if the aperture value of the optical system is changed from F1.4, which is the aperture value at the time of performing focus detection, to F2.8, which is the imaging aperture value, in order to perform the actual capture of the image after focus detection, then the movement of image plane due to the change of the aperture value causes the focused position detected at the time of focus detection to deviate from the depth of field of the optical system at the time of actually capturing the image, so that the image which was focused on the object at the time of focus detection may not be captured with a focused state. In particular, this tendency becomes greater as the aperture value of the optical system comes closer to that at the opening side. Therefore, in such a case, the aperture value at the time of detection of the focal state of the optical system is limited to F2 or more so that it cannot be F1.4, for example, thereby to suppress the amount of movement of the image plane due to the change of the aperture value, and it can thus be possible to capture an image focused on the object even if the aperture value of the optical system is changed from the aperture value at the time of detection of the focal state to the imaging aperture value. To summarize the above, the opening side limit value is a limit value at the opening side of the aperture value of the optical system which allows an image to be captured well even if the aperture value of the optical system is changed from the aperture value at the time of focus detection to the imaging aperture value, and is preliminarily stored in the memory 39 as a unique value for each lens barrel 3.

In addition or alternatively, according to the present embodiment, the lens control unit 37 may store the opening side limit value as the number of closing steps from the open aperture value. For example, provided that the opening side limit value is F2 as an aperture value (F-value), if the open aperture value is F1.2 and the number of closing steps of the aperture 34 is two steps for changing the aperture value of the optical system from the open aperture value F1.2 to the opening side limit value F2, then the camera control unit 37 may store the opening side limit value as two steps. In such a manner, the opening side limit value can be stored as the number of closing steps from the open aperture value thereby to eliminate the necessity of storing the opening side limit value for every lens position of the zoom lens because even when the lens position of the zoom lens is changed, for example, the opening side limit value depending on the lens position of the zoom lens can be obtained on the basis of the open aperture value corresponding to the lens position of the zoom lens. Note that the above-described open aperture value, opening side limit value and number of closing steps are examples, which are not limited to these values.

On the other hand, in the camera body 2, the imaging device 22 which receives light beams L1 from the above imaging optical system is provided at a predetermined focal plane of the imaging optical system. At the front surface of the same, a shutter 23 is provided. The imaging device 22 is configured of a device, such as CCD and CMOS, which converts the received optical signal to an electrical signal to send it to the camera control unit 21. Captured image information sent to the camera control unit 21 is sequentially sent to a liquid crystal drive circuit 25 and is displayed on an electronic viewfinder (EVF) 26 of a viewing optical system. When a release button (not shown) provided at the operating unit 28 is fully pressed, the captured image information is recorded in the recording medium, that is, a memory 24. The memory 24 can be any of a detachable card type memory or built-in type memory. In front of the imaging plane of the imaging device 22, an infrared cut filter for cutting the infrared light and an optical low pass filter for preventing the aliasing noise of images are arranged. Details of the structure of the imaging device 22 will be described later.

The camera control unit 21 is provided in the camera body 2. The camera control unit 21, which is electrically connected with the lens control unit 37 via an electrical signal contact unit 41 provided on the mount unit 4, receives lens information from the lens control unit 37 and sends information, such as the defocus amount and the aperture size, to the lens control unit 37. The camera control unit 21, as described above, reads out the pixel output from the imaging device 22, and processes the read pixel output as necessary by a predetermined information process to generate image information, which is output to the liquid crystal drive circuit 25 of the electronic viewfinder 26 and/or the memory 24. In addition, the camera control unit 21 controls the camera 1 as a whole, such as correction of the image information from the imaging device 22 and detection of the state of focus adjustment of the lens barrel 3 and state of aperture adjustment, etc.

Further, the camera control unit 21, in addition to the above, uses the pixel data read out from the imaging device 22 as the basis for detection of a focal state of the imaging optical system using a phase detection system and detection of a focal state of the imaging optical system using a contrast detection system. The method of detection of the focal state will be described later.

The operating unit 28 includes the shutter release button and input switches for the photographer to set various operating modes of the camera 1, and is designed to enable switching of the auto focus mode/manual focus mode. Various modes set via the operating unit 28 are sent to the camera control unit 21, which controls the operation of the camera 1 as a whole. The shutter release button includes a first switch SW1 which is turned on by half pressing of the button and a second switch SW2 which is turned on by full pressing of the button.

The imaging device 22 according to the present embodiment will now be explained.

Figure 2:
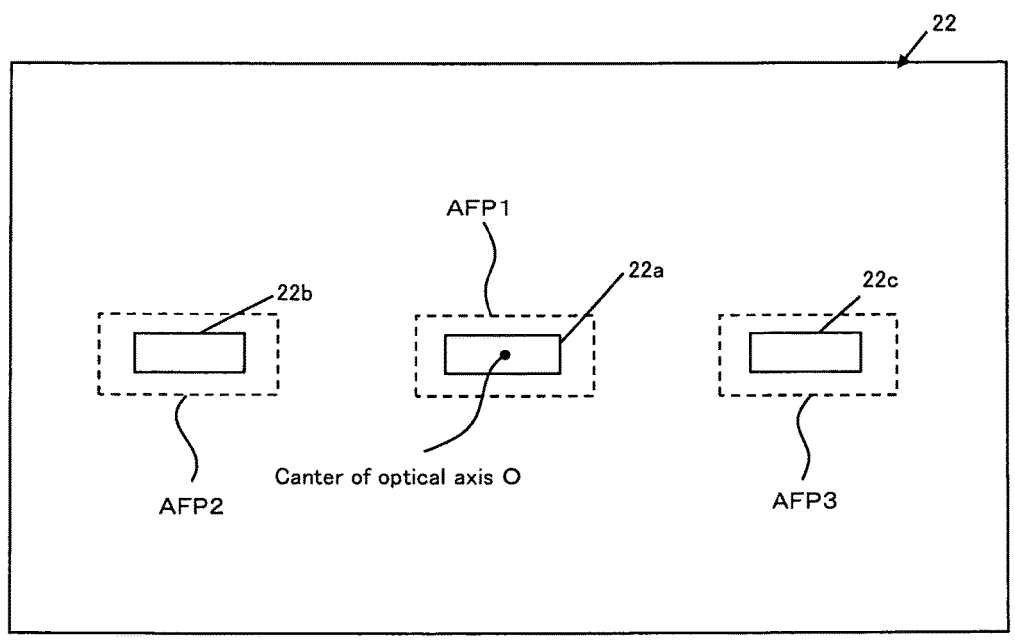
FIG. 2 is a front elevational view showing focus detection positions in an imaging plane of an imaging device shown in FIG. 1.
Figure 3:
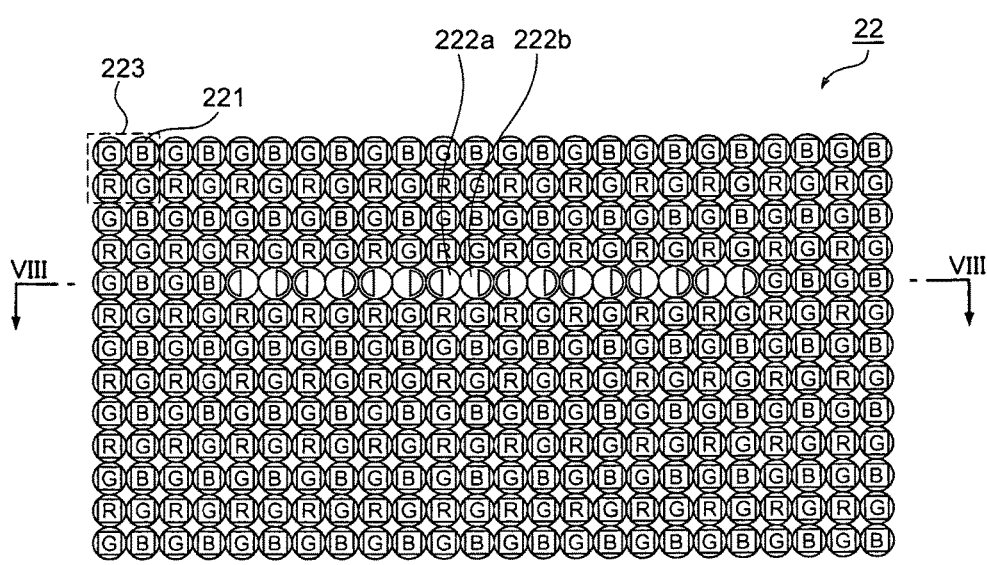
FIG. 3 is a front elevational view which enlarges the periphery of a part denoted by 22a in FIG. 2 to schematically show an arrangement of focus detection pixels 222a and 222b.

FIG. 2 is a front elevational view which shows an imaging plane of the imaging device 22, and FIG. 3 is a front elevational view which enlarges the periphery of a part denoted by 22a in FIG. 2 to schematically show the arrangement of focus detection pixels 222a and 222b.

The imaging device 22 according to the present embodiment, as shown in FIG. 3, is configured such that a plurality of imaging pixels 221 are arranged two-dimensionally on the plane of the imaging plane, i.e., green pixels G having color filters which pass the wavelength region of the green color, red pixels R having color filters which pass the wavelength region of the red color, and blue pixels B having color filters which pass the wavelength region of the blue color, are arranged on a so-called "Bayer arrangement". That is, in each group 223 of four adjoining pixels (closely packed square lattice array), two green pixels are arranged on one diagonal, while one red pixel and one blue pixel are arranged on the other diagonal. By using such groups 223 of pixels arranged in a Bayer arrangement as units and arranging such groups 223 of pixels on the imaging plane of the imaging device 22 repeatedly two-dimensionally, the imaging device 22 is configured.

The array in the unit pixel group 223 may also be a closely packed hexagonal lattice array instead of the illustrated closely packed square lattice, for example. The configuration and array of the color filters are not limited to the above. It is also possible to employ an array of complementary color filters (green: G, yellow: Ye, magenta: Mg, and cyan: Cy).

Figure 4:
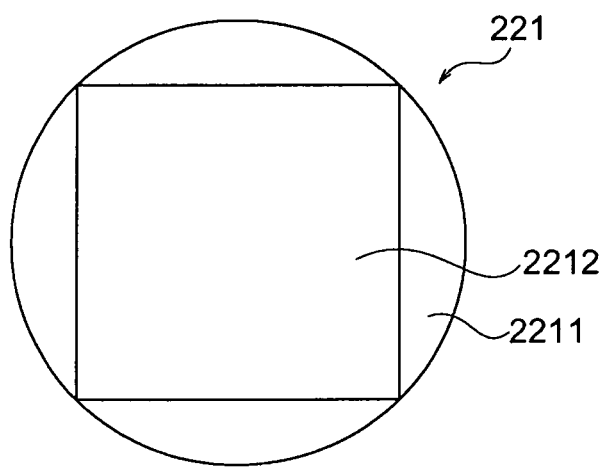
FIG. 4 is a front elevational view showing enlarged one of the imaging pixels 221.
Figure 6:
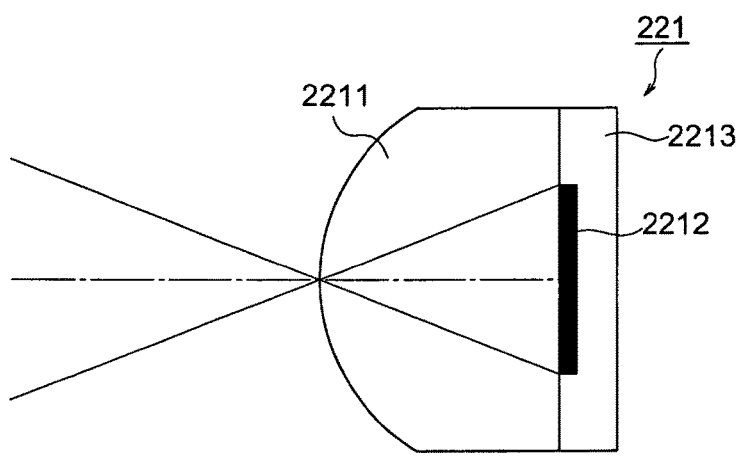
FIG. 6 is a cross-sectional view showing enlarged one of the imaging pixels 221.

FIG. 4 is a front elevational view which shows one of the imaging pixels 221 enlarged, while FIG. 6 is a cross-sectional view of the same. One imaging pixel 221 is configured of a microlens 2211, a photoelectric conversion unit 2212, and a not shown color filter. As shown in the cross-sectional view of FIG. 6, the photoelectric conversion unit 2212 is built into the surface of a semiconductor circuit board 2213 of the imaging device 22, while the microlens 2211 is formed on the surface of that. The photoelectric conversion unit 2212 is shaped to use the microlens 2211 to receive the imaging light beams passing through an exit pupil (for example, F1.0) of the imaging optical system, and thereby receives the imaging light beams.

In addition, at the center of the imaging plane of the imaging device 22 and at the left and right symmetric positions from the center, that is, at three locations, focus detection pixel strings 22a, 22b and 22c are provided, at each of which focus detection pixels 222a and 222b are arranged as substitute for the above-described imaging pixels 221. As shown in FIG. 3, one focus detection pixel string is configured such that a plurality of focus detection pixels 222a and 222b are arranged adjoining each other alternately in a horizontal string (22a, 22b, 22c). In the present embodiment, the focus detection pixels 222a and 222b are densely arranged without gap at the positions of the green pixels G and blue pixels B of the imaging pixels 221 arranged in a Bayer arrangement.

The positions of the focus detection pixel strings 22a to 22c shown in FIG. 2 are not limited to the illustrated positions. Strings may be arranged at any single location or two locations, or four or more locations. Further, during actual focus detection, the photographer can also manually operate the operating unit 28 to select a desired focus detection pixel string as the focus detection area from among the plurality of arranged focus detection pixel strings 22a to 22c.

Figure 5:
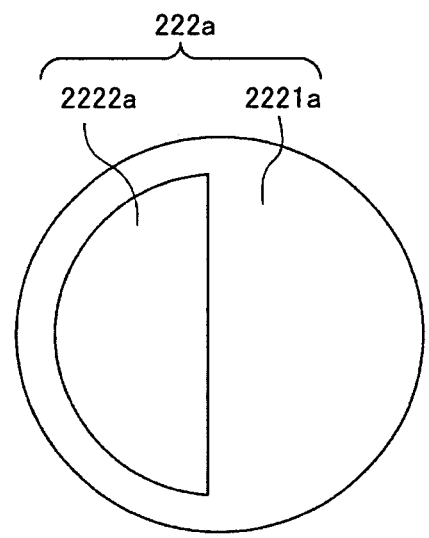
Figure 5:
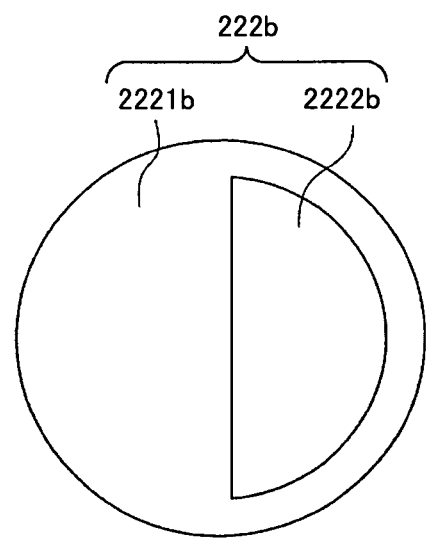
Figure 7:
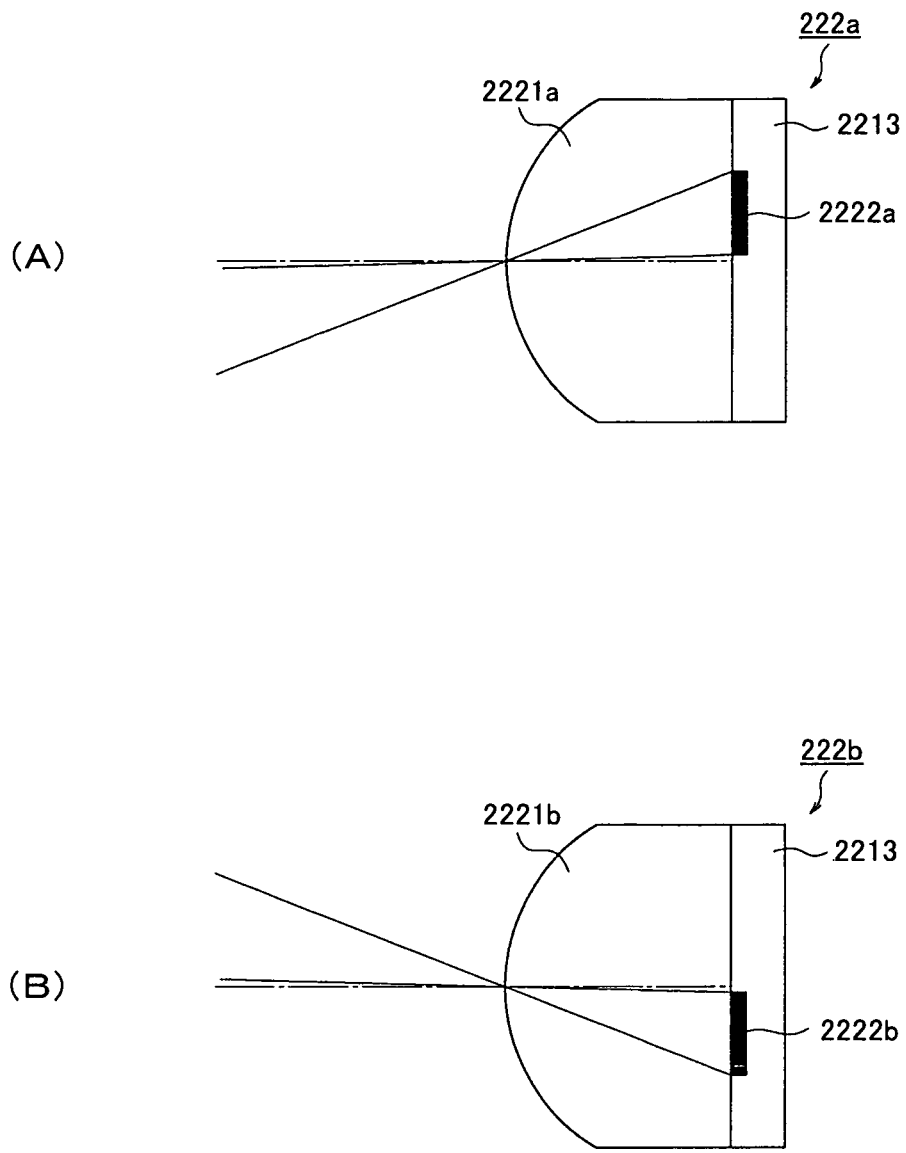

FIG. 5(A) is a front elevational view which shows one of the focus detection pixels 222a enlarged, while FIG. 7(A) is a cross-sectional view of the focus detection pixel 222a. FIG. 5(B) is a front elevational view which shows one of the focus detection pixels 222b enlarged, while FIG. 7(B) is a cross-sectional view of the focus detection pixel 222b. The focus detection pixel 222a, as shown in FIG. 5(A), is configured of a microlens 2221a and a semicircular shaped photoelectric conversion unit 2222a. As shown in the cross-sectional view of FIG. 7(A), the photoelectric conversion unit 2222a is built into the surface of the semiconductor circuit board 2213 of the imaging device 22, while the microlens 2221a is formed on the surface of that. The focus detection pixel 222b, as shown in FIG. 5(B), is configured of a microlens 2221b and a photoelectric conversion unit 2222b. As shown in the cross-sectional view of FIG. 7(B), the photoelectric conversion unit 2222b is built into the surface of the semiconductor circuit board 2213 of the imaging device 22, while the microlens 2221b is formed on the surface of that. These focus detection pixels 222a and 222b, as shown in FIG. 3, are arranged mutually adjoining each other in a horizontal string to thereby form the focus detection pixel strings 22a to 22c as shown in FIG. 2.

The photoelectric conversion units 2222a and 2222b of the focus detection pixels 222a and 222b are shaped to use the microlenses 2221a and 2221b to receive the light beams passing through predetermined regions (for example, F2.8) of the exit pupil of the imaging optical system. The focus detection pixels 222a and 222b are not provided with color filters, so that their spectral characteristics are combinations of the spectral characteristics of the photodiodes which perform the photoelectric conversion and the spectral characteristics of infrared cut filters not shown. Note, however, that each pixel may also be configured to comprise one of the same color filters as those of the imaging pixels 221, for example, the green filter.

The photoelectric conversion units 2222a and 2222b of the focus detection pixels 222a and 222b shown in FIG. 5(A) and FIG. 5(B) are made semicircular shapes, but the shapes of the photoelectric conversion units 2222a and 2222b are not limited to this. Other shapes, for example, oval shapes, rectangular shapes and polygonal shapes can also be used.

The description will now be directed to the so-called "phase difference detection system" which detects the focal state of the imaging optical system on the basis of the pixel outputs from the above-described focus detection pixels 222a and 222b.

Figure 8:
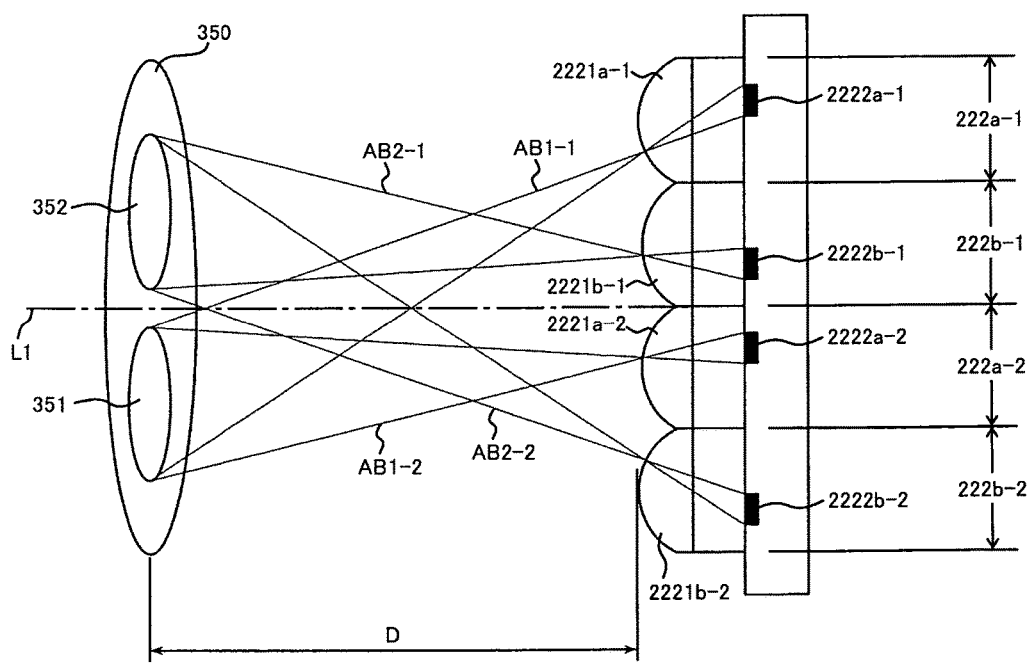
FIG. 8 is a cross-sectional view along line VIII-VIII of FIG. 3.

FIG. 8 is a cross-sectional view along line VIII-VIII of FIG. 3, and shows that the focus detection pixels 222a-1, 222b-1, 222a-2 and 222b-2 arranged near the imaging optical axis L1 and adjoining one another receive the light beams AB1-1, AB2-1, AB1-2 and AB2-2, respectively, which are emitted from the distance measuring pupils 351 and 352 of the exit pupil 350. In FIG. 8, among the plurality of focus detection pixels 222a and 222b, only those positioned near the imaging optical axis L1 are shown as examples, but the other focus detection pixels than those shown in FIG. 8 are similarly configured to receive respective light beams emitted from the pair of distance measuring pupils 351 and 352.

The "exit pupil 350" as used herein is an image which is set at the position of the distance D in front of the microlenses 2221a and 2221b of the focus detection pixels 222a and 222b arranged at the predetermined focal plane of the imaging optical system. The distance D is the value unambiguously determined in accordance with the curvature and the refractive index of the microlenses and the distance between the microlenses and the photoelectric conversion units, etc. This distance D is referred to as the "distance measuring pupil distance". The "distance measuring pupils 351 and 352" as used herein are images of the photoelectric conversion units 2222a and 2222b which are projected respectively by the microlenses 2221a and 2221b of the focus detection pixels 222a and 222b.

In FIG. 8, the direction of arrangement of the focus detection pixels 222a-1, 222b-1, 222a-2 and 222b-2 matches the direction of arrangement of the pair of distance measuring pupils 351 and 352.

As shown in FIG. 8, the microlenses 2221a-1, 2221b-1, 2221a-2 and 2221b-2 of the focus detection pixels 222a-1, 222b-1, 222a-2 and 222b-2 are arranged near the predetermined focal plane of the imaging optical system. When the shapes of the photoelectric conversion units 2222a-1, 2222b-1, 2222a-2 and 2222b-2 arranged behind the microlenses 2221a-1, 2221b-1, 2221a-2 and 2221b-2 are projected on the exit pupil 350 which is separated from the microlenses 2221a-1, 2221b-1, 2221a-2 and 2221b-2 by exactly the distance measurement distance D, the projected shapes form the distance measuring pupils 351 and 352.

In other words, the relative positional relationships of the microlenses and the photoelectric conversion units in the focus detection pixels are set so that the projected shapes (distance measuring pupils 351 and 352) of the photoelectric conversion units of the focus detection pixels match on the exit pupil 350 at the distance measurement distance D, and the directions of projection of the photoelectric conversion units in the focus detection pixels are thus determined.

As shown in FIG. 8, the photoelectric conversion unit 2222a-1 of the focus detection pixel 222a-1 outputs a signal corresponding to the intensity of an image formed on the microlens 2221a-1 by the light beam AB1-1 which passes through the distance measuring pupil 351 and heads toward the microlens 2221a-1. Similarly, the photoelectric conversion unit 2222a-2 of the focus detection pixel 222a-2 outputs a signal corresponding to the intensity of an image formed on the microlens 2221a-2 by the light beam AB1-2 which passes through the distance measuring pupil 351 and heads toward the microlens 2221a-2.

The photoelectric conversion unit 2222b-1 of the focus detection pixel 222b-1 outputs a signal corresponding to the intensity of an image formed on the microlens 2221b-1 by the light beam AB2-1 which passes through the distance measuring pupil 352 and heads toward the microlens 2221b-1. Similarly, the photoelectric conversion unit 2222b-2 of the focus detection pixel 222b-2 outputs a signal corresponding to the intensity of an image formed on the microlens 2221b-2 by the light beam AB2-2 which passes through the distance measuring pupil 352 and heads toward the microlens 2221b-2.

By arranging the above-described two types of plural focus detection pixels 222a and 222b in a straight line as shown in FIG. 3 and grouping the outputs of the photoelectric conversion units 2222a and 2222b of the focus detection pixels 222a and 222b into respective output groups corresponding to the distance measuring pupils 351 and 352, data is obtained relating to the intensity distributions of the pair of images which the focus detection light beams passing through the distance measuring pupils 351 and 352 form on the focus detection pixel strings. This intensity distribution data can be processed by image deviation detection operation, such as correlation operation or phase difference detection, thereby to detect an image deviation amount by the so-called phase difference detection system.

Further, by processing the obtained image deviation amount using conversion operation depending on the interval between the centers of gravity of the pair of distance measuring pupils, it is possible to obtain the deviation of the current focal plane with respect to the predetermined focal plane (focal plane at focus detection area corresponding to position of microlens array on predetermined focal plane), that is, the defocus amount.

The calculation of the image deviation amount using the phase difference detection system and the calculation of the defocus amount based thereon are performed by the camera control unit 21.

Further, the camera control unit 21 reads out the outputs of the imaging pixels 221 of the imaging device 22 and uses the read out pixel outputs as the basis to calculate a focus evaluation value. This focus evaluation value can be obtained, for example, by extracting the high frequency components of the image outputs from the imaging pixels 221 of the imaging device 22 using a high frequency pass filter. In an alternative embodiment, it may be obtained by using two high frequency pass filters with different cutoff frequencies to extract the high frequency components.

The camera control unit 21 then sends a control signal to the lens control unit 37 to drive the focus lens 32 at a predetermined sampling interval (distance), thereby obtaining focus evaluation values at different positions and finding the position of the focus lens 32 where the focus evaluation value becomes maximum as a focused position, i.e., performing focus detection by the contrast detection system. This focused position can be obtained, for example, when calculating the focus evaluation values while driving the focus lens 32, by interpolation or other calculation using those focus evaluation values which take a value that rises twice and thereafter drops twice.

Figure 9:
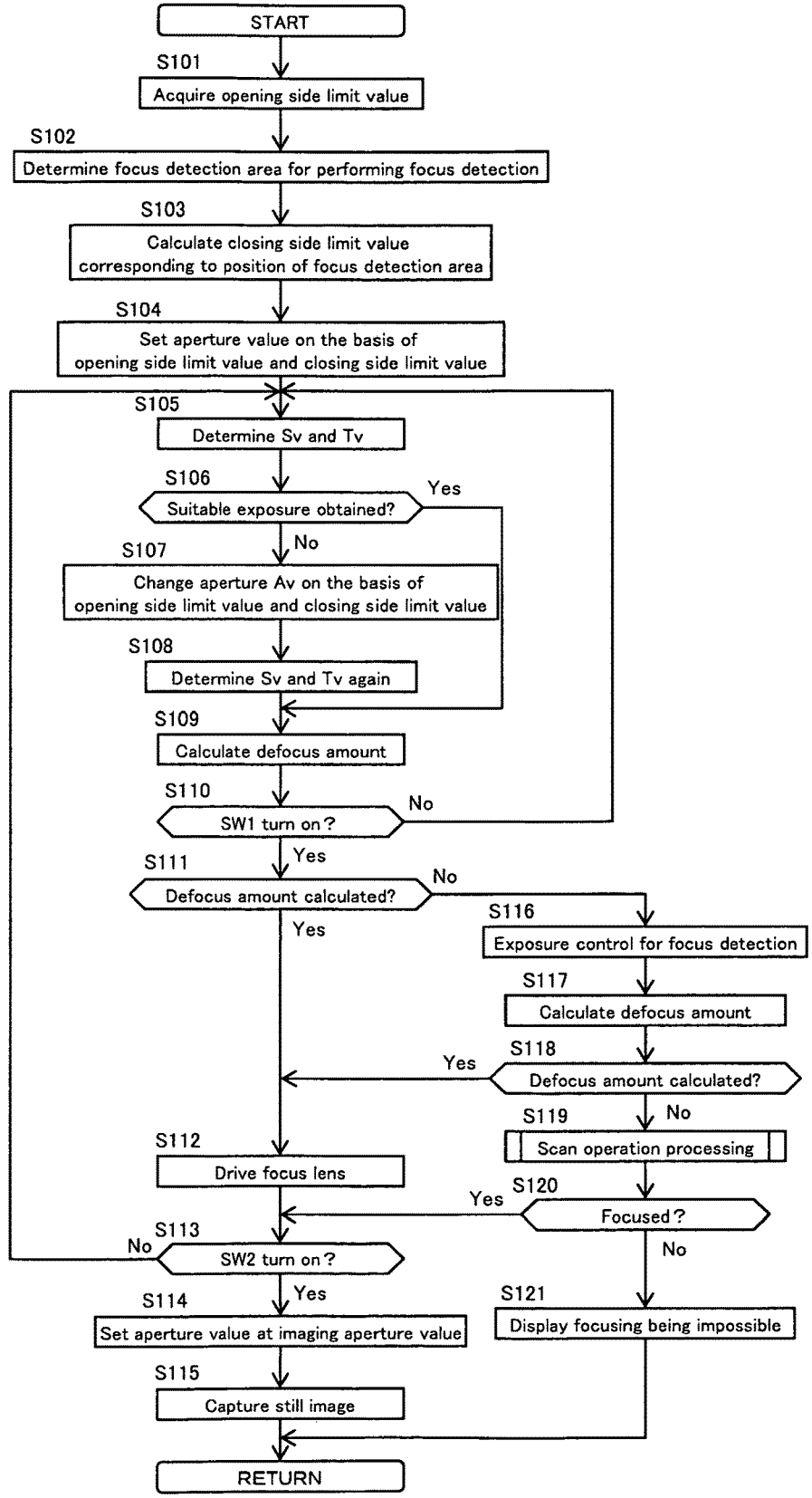
FIG. 9 is a flow chart showing an operation of the camera according to the present embodiment.

An example of the operation of the camera 1 according to the present embodiment will then be described. FIG. 9 is a flowchart showing an example of the operation of the camera 1 according to the present embodiment. The following operation is started by the power of the camera 1 being turned on.

First at step S101, the camera control unit 21 performs acquisition of an opening side limit value. The opening side limit value is a limit value at the opening side of the aperture value of the optical system at the time of detection of the focal state of the optical system, and is stored in the memory 39 of the lens barrel 3. Therefore, the camera control unit 21 acquires the opening side limit value from the memory 39 via the lens control unit 37. According to the present embodiment, the opening side limit value is stored in the memory 39 of the lens barrel 3 as the number of closing steps from the open aperture value, and hence the camera control unit 21 uses the open aperture value and the number of closing steps from the open aperture value as the basis to obtain a limit value at the opening side (F-value) of the aperture value of the optical system at the time of performing focus detection as the opening side limit value.

At step S102, the camera control unit 21 performs processing to determine a focus detection area for performing focus detection. For example, the camera control unit 21 detects a specific object in the captured image, such as the face of a person, on the basis of image signals output from the imaging pixels 221, and determines, among the plurality of focus detection areas AFP1 to AFP3 set in the shooting screen as shown in FIG. 2, a focus detection area corresponding to the detected specific object as the focus detection area for performing focus detection.

Thereafter at step S103, the camera control unit 21 calculates a closing side limit value on the basis of the position of the focus detection area determined at step S102.

Specifically, when performing focus detection in the focus detection area determined at step S102, the camera control unit 21 calculates, among aperture values that can effectively prevent the occurrence of vignetting and allow good focus detection accuracy to be obtained, a value at the most closing side as the closing side limit value.

Here, the degree of vignetting decreases as the position of the focus detection area comes closer to the center position of the optical axis while increasing with the distance therefrom. In addition, the degree of vignetting decreases as the aperture value of the optical system becomes a value at the opening side while increasing as the aperture value becomes a value at the closing side. Accordingly, as the focus detection area for performing focus detection comes closer to the center of the optical axis, the camera control unit 21 calculates the closing side limit value to be a value at the closing side, while on the other hand, as the focus detection area for performing focus detection comes farther away from the center of the optical axis, the camera control unit 21 calculates the closing side limit value to be a value at the opening side. For example, according to the example shown in FIG. 2, the closing side limit value for the focus detection area AFP1 is calculated to be a value at the closing side more than those for the positions of the focus detection areas AFP2 and AFP3 because the focus detection area AFP1 is located nearer to the center O of the optical axis than the focus detection areas AFP2 and AFP3.

Figure 10:
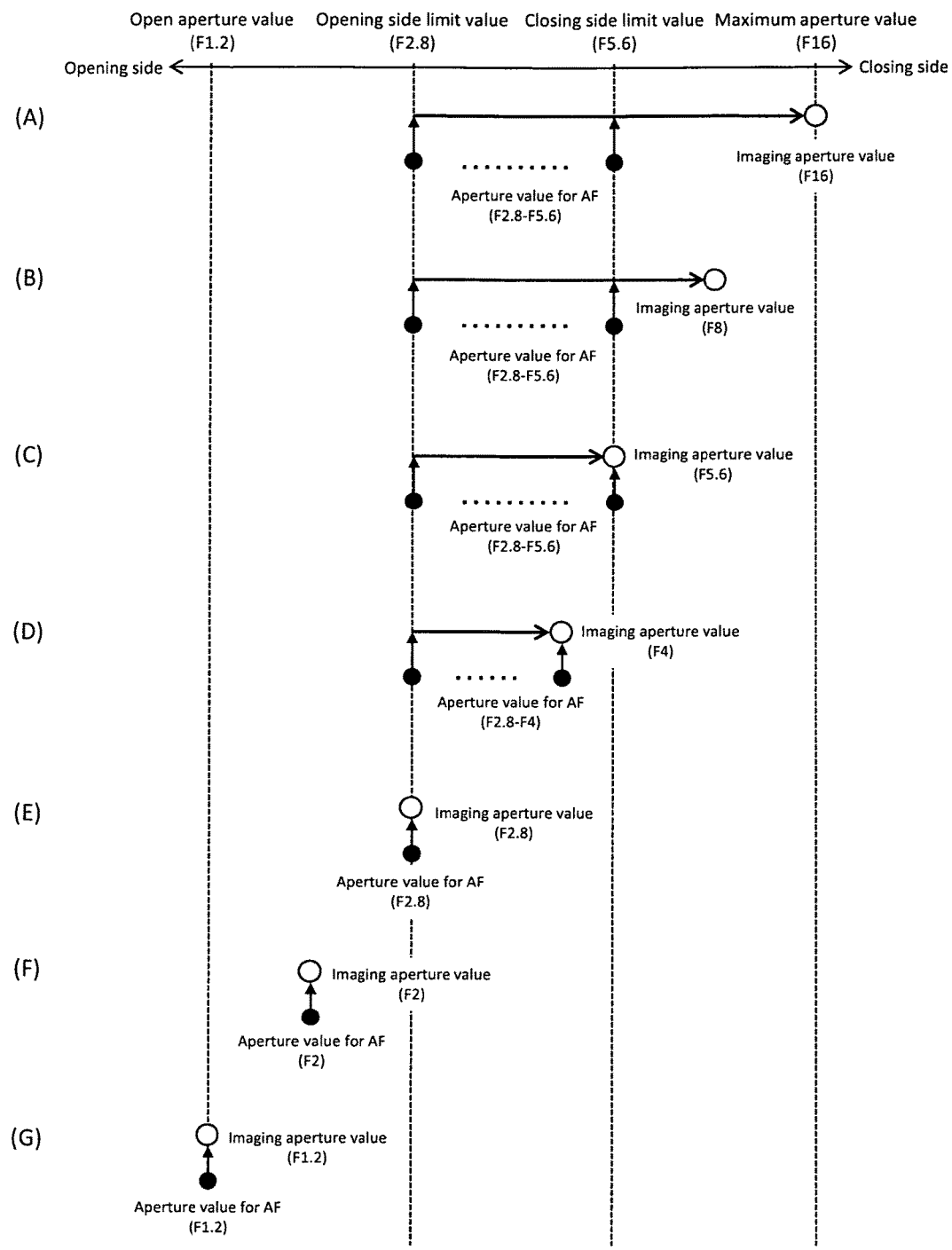
FIG. 10 is a diagram showing one example of the relationship between aperture values at the time of focus detection and imaging aperture values.

Thereafter at step 104, the camera control unit 21 performs processing to set the aperture value (F-value) of the optical system at an aperture value for performing focus detection, on the basis of the opining side limit value acquired at step S101 and the closing side limit value acquired at step S103. Specifically, when the imaging aperture value set for actually capturing an image is a value at the closing side from the closing side limit value, the camera control unit 21 sets the aperture value of the optical system at the closing side limit value. Here, FIG. 10 is a diagram which shows an example of the relationship between the aperture values set for performing focus detection and the imaging aperture values. The example shown in FIG. 10 illustrates a scene in which the opening side limit value is acquired as F2.8 and the closing side limit value is acquired as F5.6 for a lens barrel 3 which has an open aperture value of F1.2 and a maximum aperture value (maximum F-value) of F16. For example, in the case shown in (A) of FIG. 10, the imaging aperture value is set at F16, which is a value at the closing side from the closing side limit value F5.6, so the camera control unit 21 sets the aperture value of the optical system at the closing side limit value F5.6. Also in the case shown in (B) of FIG. 10, the imaging aperture value is F8, so in the same way as in (A) of FIG. 10, the camera control unit 21 sets the aperture value of the optical system at the closing side limit value F5.6.

On the other hand, when the imaging aperture value set for actually capturing an image is the same value as the closing side limit value or a value at the opening side from the closing side limit value, the camera control unit 21 sets the aperture value of the optical system at the imaging aperture value. For example, in the case shown in (C) of FIG. 10, the imaging aperture value is the same F5.6 as the closing side limit value, so the camera control unit 21 sets the aperture value of the optical system at the imaging aperture value F5.6. Also in the case shown in (D) of FIG. 10, the imaging aperture value is set at F4, which is a value at the opening side from the closing side limit value F5.6, so the camera control unit 21 sets the aperture value of the optical system at the imaging aperture value F4. Similarly, also in the cases shown in (E) to (G) of FIG. 10, in the same way as in (D) of FIG. 10, the imaging aperture value is a value at the opening side from the closing side limit value, so the camera control unit 21 sets the aperture value of the optical system at the imaging aperture value.

At step S105, the camera control unit 21 is used to split the captured picture into a plurality of regions and measure the light for each split region, that is, perform multi-split photometry (multi-pattern photometry), and calculates the brightness value By of the captured picture as a whole. Further, the camera control unit 21 uses the calculated brightness value By of the captured picture as a whole as the basis to change at least one of the light receiving sensitivity Sv and exposure time Tv so that a suitable exposure is obtained at the captured picture as a whole. Note that, at step S105, the aperture Av corresponding to the aperture value set at step S104 is left fixed while at least one of the light receiving sensitivity Sv and exposure time Tv is changed. The changed light receiving sensitivity Sv and/or exposure time Tv are used as the basis, for example, to set the shutter speed of the shutter 23 and the sensitivity of the imaging device 22, etc. so as to control the exposure for the imaging device 22.

At step S106, the camera control unit 21 determines whether suitable exposure is obtained or not at the captured picture as a whole by the exposure control at step S105. When the change of the light receiving sensitivity Sv and/or exposure time Tv is not enough to obtain suitable exposure of the captured picture as a whole, the routine proceeds to step S107, while when the change of at least one of the light receiving sensitivity Sv and exposure time Tv is enough to obtain suitable exposure of the captured picture as a whole, the routine proceeds to step S109.

At step S107, the camera control unit 21 changes the aperture Av because the determination has been done such that the change of the light receiving sensitivity Sv and/or exposure time Tv is not enough to obtain suitable exposure at the captured picture as a whole. Specifically, when the imaging aperture value is a value at the closing side from the closing side limit value, the camera control unit 21 changes the aperture Av on the basis of the brightness value By of the captured picture as a whole so that the aperture value of the optical system falls within a range between the opening side limit value and the closing side limit value. For example, in the case shown in (A) of FIG. 10, the imaging aperture value F16 is a value at the closing side from the closing side limit value F5.6, so the camera control unit 21 changes the aperture Av so that the aperture value of the optical system falls within the range from the opening side limit value F2.8 to the closing side limit value F5.6, and performs exposure control so that suitable exposure is obtained at the captured picture as a whole. The same applies to the case shown in (B) of FIG. 10.

On the other hand, when the imaging aperture value is the same value as the closing side limit value or a value at the opening side from the closing side limit value, the camera control unit 21 changes the aperture Av on the basis of the brightness value By of the captured picture as a whole so that the aperture value of the optical system falls within a range between the opening side limit value and the imaging aperture value. For example, in the case shown in (C) of FIG. 10, the imaging aperture value F5.6 is the same value as the closing side limit value F5.6, so the camera control unit 21 changes the aperture Av so that the aperture value of the optical system falls within a range from the opening side limit value F2.8 to the imaging aperture value F5.6. In the case shown in (D) of FIG. 10, the imaging aperture value F4 is a value at the opening side from the closing side limit value F5.6, so the camera control unit 21 changes the aperture Av so that the aperture value of the optical system falls within a range from the opening side limit value F2.8 to the imaging aperture value F4.

Note that, when the imaging aperture value is the same value as the opening side limit value or a value at the opening side from the opening side limit value, the camera control unit 21 leaves the aperture value of the optical system as the imaging aperture value. For example, in the case shown in (E) of FIG. 10, the imaging aperture value F2.8 is the same value as the opening side limit value F2.8, so the camera control unit 21 leaves the aperture value of the optical system as the imaging aperture value F2.8. The same applies to the cases shown in (F) and (G) of FIG. 10. In addition, according to the present embodiment, when the aperture Av can be changed within a certain range of the aperture value, for example as shown in (A) to (D) of FIG. 10, the camera control unit 21 may change the aperture Av to the opening side with some margin so that the aperture Av may not have to be changed again even if the brightness value By of the captured picture as a whole further changes.

At step S108, the camera control unit 21 determines the light receiving sensitivity Sv and exposure time Tv so that suitable exposure is obtained at the captured picture as a whole using the aperture Av changed at step S107. Specifically, the camera control unit 21, in the same way as step S105, measures the light at the captured picture as a whole by multi-pattern photometry to calculate the brightness value By of the captured picture as a whole. The camera control unit 21 then uses the calculated brightness value By and the aperture Av changed at step S107 as the basis to determine the light receiving sensitivity Sv and exposure time Tv that provide suitable exposure at the captured picture as a whole, which are used in combination with the aperture Av changed at step S107 as the basis to control exposure for the imaging device 22.

Thereafter at step S109, the camera control unit 21 performs processing to calculate the defocus amount using the phase difference detection system. Specifically, the imaging device 22 first receives light beams from the optical system, and the camera control unit 21 then reads out a pair of image data corresponding to a pair of images from the focus detection pixels 222a and 222b which constitute each of the three focus detection pixel strings 22a to 22c of the imaging device 22. In this case, a configuration is also possible such that when manual operation of the photographer selects a specific focus detection position, only the data from the focus detection pixels corresponding to that focus detection position is read out. The camera control unit 21 then uses the read-out pair of image data as the basis to perform image deviation detection processing (correlation processing), and calculates a shift amount at the focus detection position corresponding to at least one of the three focus detection pixel strings 22a to 22c, which is further converted to the defocus amount. In addition, the camera control unit 21 evaluates the reliability of the calculated defocus amount. For example, the camera control unit 21 uses the degree of match of the pair of image data and/or contrast etc. as the basis to determine the reliability of the defocus amount.

At step S110, the camera control unit 21 determines whether the shutter release button provided at the operating unit 28 was half pressed (first switch SW1 turned on). If the shutter release button was half pressed, then the routine proceeds to step S111. If, on the other hand, the shutter release button was not half pressed, then the routine returns to step S105 and the exposure control and calculation of the defocus amount are repeatedly performed until the shutter release button is half pressed.

At step S111, the camera control unit 21 determines whether the defocus amount was able to be calculated by the phase difference detection system. If the defocus amount was able to be calculated, then the distance is determined to be measurable and the routine proceeds to step S112, while on the other hand if the defocus amount was not able to be calculated, then the distance is determined not to be measurable and the routine proceeds to step S116. According to the present embodiment, even though the defocus amount was able to be calculated, cases where the calculated defocus amount has low reliability are treated as if the defocus amount was not able to be calculated, and the routine will proceed to step S116. For example, in the present embodiment, the reliability of the defocus amount is determined to be low if the contrast of the object is low, the object is a very low brightness object, or the object is a very high brightness object, etc.

At step S112, the camera control unit 21 uses the defocus amount calculated at step S109 as the basis to calculate a lens drive amount that is required for driving the focus lens 32 to the focused position, and the calculated lens drive amount is sent through the lens control unit 37 to the focus lens drive motor 36. This allows the focus lens drive motor 36 to drive the focus lens 32 on the basis of the calculated lens drive amount.

At step S113, the camera control unit 21 determines whether or not the shutter release button has been fully pressed (second switch SW2 turned on). If the second switch SW2 is turned on, then the routine proceeds to step S114, while on the other hand if the second switch SW2 is not turned on, then the routine returns to step S105.

At step S114, to actually capture the image, the camera control unit 21 performs processing to set the aperture value of the optical system at the imaging aperture value. For example, in the case shown in (A) of FIG. 10, to actually capture the image, the camera control unit 21 changes the aperture value of the optical system from the aperture value at the time of focus detection (within the range from the opening side limit value F2.8 to the closing side limit value F5.6) to the imaging aperture value F16. Similarly in the cases shown in (B) to (G) of FIG. 10, the aperture value of the optical system is changed from the aperture value for performing focus detection to the imaging aperture value for actually capturing the image. At the subsequent step S115, the imaging device 22 performs actual capture of the image using the aperture value set at step S114, and the image data of the captured image is stored in the memory 24.

On the other hand, if it was determined in step S111 that the defocus amount was not able to be calculated, then the routine proceeds to step S116 to achieve exposure suitable for focus detection. At step S116, the camera control unit 21 performs exposure control for focus detection so that exposure suitable for focus detection can be obtained. Specifically, the camera control unit 21 uses the output from the imaging device 22 as the basis to measure the light by spot photometry in a predetermined region that includes the focus detection area (focus detection pixel string 22a, 22b, 22c shown in FIG. 2) thereby to calculate a brightness value SpotBv in the predetermined region including the focus detection area. The camera control unit 21 then uses the calculated brightness value SpotBv as the basis to determine the light receiving sensitivity Sv, exposure time Tv, and aperture Av so that exposure suitable for focus detection (e.g., exposure one step brighter than suitable exposure) is obtained. Also in the exposure control for focus detection at step S116, like in those at steps S105 to S108, the camera control unit 21 changes preferentially the light receiving sensitivity Sv and the exposure time Tv, and only when the change of the light receiving sensitivity Sv and the exposure time Tv is not enough to obtain exposure suitable for focus detection, the aperture Av is changed on the basis of the opening side limit value and the closing side limit value which were acquired at steps S101 and S103. That is, when the imaging aperture value is a value at the closing side from the closing side limit value as shown in the cases of (A) and (B) of FIG. 10, the camera control unit 21 changes the aperture Av on the basis of the brightness values SpotBv in the predetermined region including the focus detection area so that the aperture value of the optical system falls within a range between the opening side limit value and the closing side limit value. On the other hand, when the imaging aperture value is the same value as the closing side limit value or a value at the opening side from the closing side limit value as shown in (C) and (D) of FIG. 10, the aperture Av is changed on the basis of the brightness values SpotBv in the predetermined region including the focus detection area so that the aperture value of the optical system falls within a range between the opening side limit value and the imaging aperture value. Further, when the imaging aperture value is the same value as the opening side limit value or a value at the opening side from the opening side limit value as shown in (E) to (G) of FIG. 10, the aperture value of the optical system is left as the imaging aperture value.

At step S117, the camera control unit 21 uses the image data obtained by exposure suitable for the focus detection as the basis to calculate the defocus amount. At the subsequent step S118, the camera control unit 21 uses the image data obtained by exposure suitable for the focus detection as the basis to determine whether the defocus amount was able to be calculated or not. If the defocus amount was able to be calculated, then the routine proceeds to step S112 where the calculated defocus amount is used as the basis for processing to drive the focus lens 32. If, on the other hand, the defocus amount was not able to be calculated even using the image data obtained by exposure suitable for the focus detection, then the routine proceeds to step S119 where the scan operation processing is performed as will be described later. Also at step S118, like at step S111, even though the defocus amount was able to be calculated, cases where the calculated defocus amount has low reliability are treated as if the defocus amount was not able to be calculated.

Figure 11:
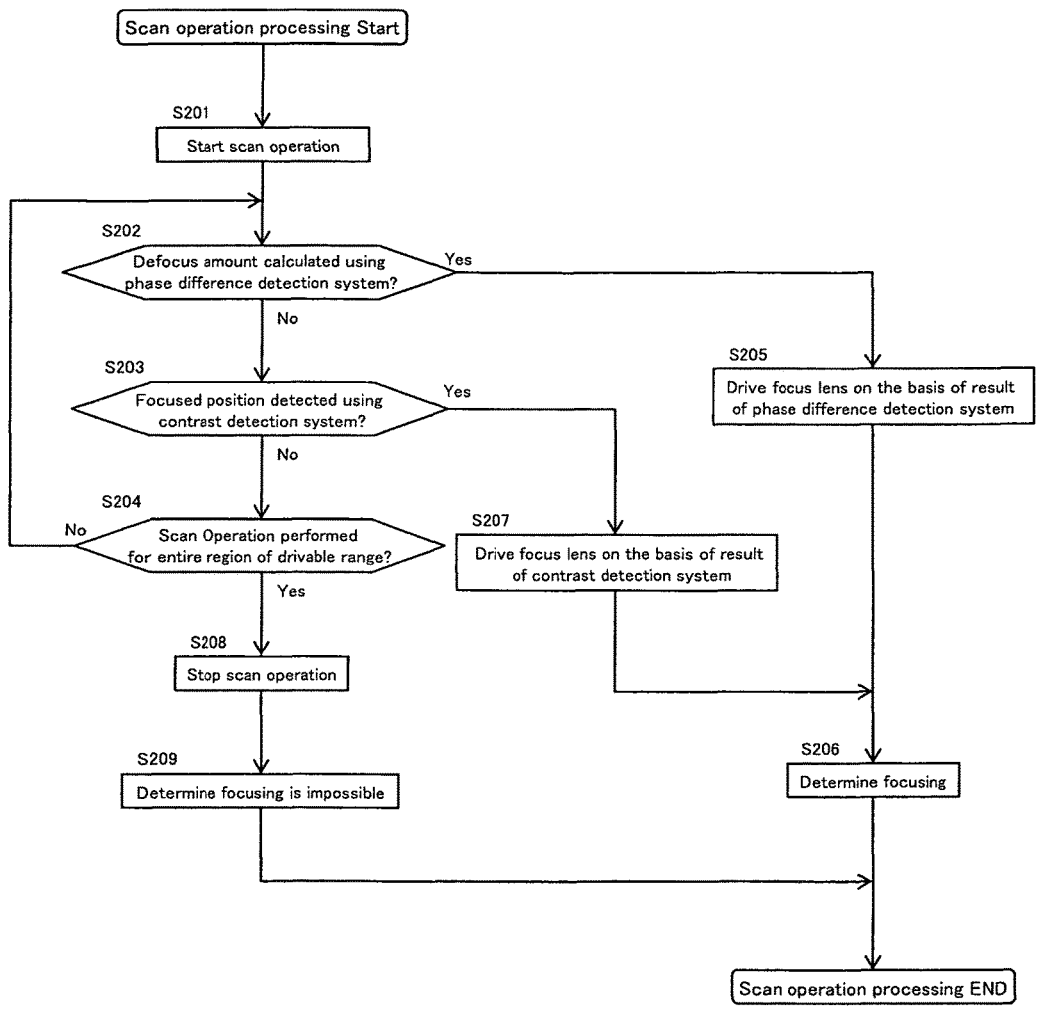
FIG. 11 is a flow chart showing scan operation processing at step S119.

At step S119, the camera control unit 21 performs scan operation processing for performing a scan operation. The "scan operation" as used herein is an operation in which the camera control unit 21 concurrently performs calculation of the defocus amount using the phase difference detection system and calculation of the focus evaluation value at a predetermined interval while driving the focus lens 32 for scanning, thereby to concurrently perform detection of the focused position using the phase difference detection system and detection of the focused position using the contrast detection system at a predetermined interval. With reference to FIG. 11, the following description will be directed to the scan operation processing according to the present embodiment. FIG. 11 is a flow chart showing the scan operation processing according to the present embodiment.

First at step S201, the camera control unit 21 performs processing for starting the scan operation. Specifically, the camera control unit 21 sends to the lens control unit 37 a scan drive start instruction, which is used by the lens control unit 37 as the basis to drive the focus lens drive motor 36 and drive the focus lens 32 along the optical axis L1 for scanning. The direction in which the scan drive is performed is not particularly limited, and the scan drive of the focus lens 32 may be performed from the infinite end to the near end or otherwise from the near end to the infinite end.

The camera control unit 21 then operates to: read out a pair of image data corresponding to a pair of images from the focus detection pixels 222a and 222b of the imaging device 22 at a predetermined interval while driving the focus lens 32; use the read-out data as the basis for calculating the defocus amount using the phase difference detection system and evaluating the reliability of the defocus amount calculated; read out the pixel outputs from the imaging pixels 221 of the image pickup device 22 at a predetermined interval while driving the focus lens 32; and use the read-out pixel outputs as the basis to calculate the focus evaluation value thereby acquiring focus evaluation values at different focus lens positions so as to detect the focused position using the contrast detection system.

At step S202, determination is made whether or not the defocus amount was able to be calculated using the phase difference detection system as a result of the scan operation performed by the camera control unit 21. If the defocus amount was able to be calculated, it is determined that the distance can be measured and the routine proceeds to step S205, while on the other hand, if the defocus amount was not able to be calculated, it is determined that the distance cannot be calculated and the routine proceeds to step S203.

At step S203, determination is made whether or not the focused position was able to be detected using the contrast detection system as a result of the scan operation performed by the camera control unit 21. If the focused position was able to be detected using the contrast detection system, the routine proceeds to step S207, while on the other hand, if the focused position was not able to be detected, the routine proceeds to step S204.

At step S204, the camera control unit 21 determines whether or not the scan operation has been performed for the entire region of the drivable range of the focus lens 32. If the scan operation is not performed for the entire region of the drivable range of the focus lens 32, then the routine returns to step S202, and steps S202 to S204 are repeated thereby continuing to perform the scan operation, that is, an operation to concurrently perform calculation of the defocus amount using the phase difference detection system and detection of the focused position using the contrast detection system at a predetermined interval. If, on the other hand, the scan operation is completed for the entire region of the drivable range of the focus lens 32, then the routine proceeds to step S208.

As a result of the scan operation performed, if the determination was made at step S202 that the defocus amount was able to be calculated using the phase difference detection system, then the routine proceeds to step S205 where a focusing operation is performed based on the defocus amount calculated using the phase difference detection system.

More specifically, at step S205, after the camera control unit 21 performs processing to stop the scan operation, the calculated defocus amount is used to calculate a lens drive amount required for the focus lens 32 to be driven to the focused position, and the calculated lens drive amount is sent through the lens control unit 37 to the lens drive motor 36. The lens drive motor 36 then uses the lens drive amount calculated by the camera control unit 21 as the basis to drive the focus lens 32 to the focused position. When the drive operation of the focus lens 32 to the focused position is completed, the routine proceeds to step S206 where the camera control unit 21 determines the focused state.

As a result of the scan operation performed, if the determination was made at step S203 that the focused position was able to be detected using the contrast detection system, then the routine proceeds to step S207 where a drive operation for the focus lens 32 is performed based on the focused position detected using the contrast detection system.

More specifically, after the camera control unit 21 performs processing to stop the scan operation, the focused position detected by the contrast detection system is used as the basis to perform lens drive processing to drive the focus lens 32 to the focused, position. When the drive of the focus lens 32 to the focused position is completed, the routine proceeds to step S206 where the camera control unit 21 determines the focused state.

If, on the other hand, the execution of the scan operation was determined to be completed for the entire region of the drivable range of the focus lens 32, then the routine proceeds to step S208. At step S208, processing is performed to end the scan operation because as a result of the scan operation performed, the focus detection was not able to be performed by any of the phase difference detection system and the contrast detection system. The routine then proceeds to step S209 where the camera control unit 21 determines that focusing is not possible.

After the scan operation processing at step S119 has been completed, the routine proceeds to step S120 where the camera control unit 21 uses the result of the focused state determination in the scan operation processing as the basis to determine whether focusing was possible or not. If the focusing was determined to be possible in the scan operation processing (step S206), then the routine proceeds to step S113. If, on the other hand, the focusing was determined not to be possible (step S209), then the routine proceeds to step S121 where the focusing being impossible is displayed. The display of the focusing being impossible is performed using the electronic viewfinder 26, for example.

As described above, according to the present embodiment, the limit value at the opening side of the aperture value of the optical system at the time of performing focus detection is acquired as an opening side limit value from the lens barrel 3, while the limit value at the closing side of the aperture value of the optical system at the time of performing focus detection is calculated as a closing side limit value in accordance with the position of the focus detection area in which focus detection is performed. Further, the opening side limit value acquired from the lens barrel 3 and the closing side limit value corresponding to the focus detection area for performing focus detection are used as the basis to set the aperture value of the optical system at the time of performing focus detection. Specifically, when the imaging aperture value at the time of capturing an image is a value at the closing side from the closing side limit value, the aperture value of the optical system at the time of performing focus detection is set within a range between the opening side limit value and the closing side limit value. Thus according to the present embodiment, the aperture value of the optical system at the time of performing focus detection is limited to a value at the closing side from the opening side limit value thereby to allow the amount of movement of the image plane of the optical system due to a change of the aperture value of the optical system to be a predetermined amount or less even when the aperture value of the optical system is changed in order to actually capture an image from the aperture value at the time of focus detection to an imaging aperture value for actually capturing the image, so that the focused position detected at the time of focus detection can fall within the range of the depth of field of the optical system at the time of actually capturing the image, and the image focused on the object can therefore be captured.

Moreover, according to the present embodiment, when the imaging aperture value at the time of actually capturing an image is a value at the closing side from the closing side limit value, the aperture value of the optical system at the time of performing focus detection may be limited to a value at the opening side from the closing side limit value thereby to effectively prevent the occurrence of vignetting at the time of focus detection and to allow the focal state of the optical system to be detected appropriately. Furthermore, according to the present embodiment, when the imaging aperture value is a value at the opening side from the closing side limit value, the aperture value of the optical system at the time of performing focus detection may be set within a range between the opening side limit value and the imaging aperture value thereby to limit the aperture value of the optical system at the time of performing focus detection so as not to become a value at the closing side from the imaging aperture value. This allows to effectively prevent an event that, when actually capturing an image, the depth of field at the time of actually capturing the image becomes shallower than the depth of field at the time of performing focus detection so that an object focused at the time of focus detection deviates from the depth of field of the optical system at the time of actually capturing the image, thus resulting in an advantage that the image focused on the object can be captured well.

In addition, according to the present embodiment, the closing side limit value can be calculated on the basis of the position of the focus detection area for performing focus detection thereby to effectively prevent the occurrence of vignetting, and the closing side limit value at which good focus detection accuracy is obtained can thus be set with higher accuracy. This allows the aperture value at the time of focus detection to be set more appropriately.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, the above-described embodiment has been exemplified to have a configuration in which the aperture value at the time of focus detection is set on the basis of the closing side limit value corresponding to the focus detection area for performing focus detection, but the present invention is not limited to this configuration, and an alternative configuration is also possible in which the closing side limit value corresponding to the position of the exit pupil of the optical system is calculated, for example, and this position of the exit pupil of the optical system is used as the basis to set the aperture of the optical system at the time of focus detection. For example, when the focus lens 32 and/or zoom lens are arranged at the body side relative to the aperture 34, the position of the exit pupil of the optical system may vary due to the drive of the focus lens 32 and/or zoom lens. In such a case, if the distance between the exit pupil 350 and the distance measuring pupil 351, 352 in the optical axis direction is large, then the degree of vignetting becomes unbalanced between the pair of focus detection pixels 222a and 222b, and/or the degree of vignetting becomes large at each of the focus detection pixels 222a and 222b. In this regard, a configuration may be possible in which, as the position of the exit pupil 350 of the optical system comes closer to the position of the distance measuring pupil 351, 352, the closing side limit value is calculated as a value at the closing side, while, as the position of the exit pupil 350 of the optical system comes farther away from the position of the distance measuring pupil 351, 352, the closing side limit value is calculated as a value at the opening side, and the closing side limit value is thereby calculated depending on the position of the exit pupil of the optical system. Also in this case, the occurrence of vignetting can effectively be prevented, and the closing side limit value at which good focus detection accuracy is obtained can thus be set with higher accuracy. Moreover, a configuration is also possible in which the closing side limit value is calculated to correspond to the position of the focus detection area and the position of the exit pupil of the optical system. In this case, the closing side limit value can be set with further higher accuracy.

The above-described embodiment has been exemplified to have a configuration in which the position of the focus detection area is used as the basis to calculate and obtain the closing side limit value corresponding to the position of the focus detection area, but in which case a specific configuration is possible such that plural closing side limit values corresponding to respective positions of the focus detection areas are preliminarily stored in a memory provided in the camera control unit 21, for example, and the closing side limit value corresponding to the focus detection area for performing focus detection is calculated and obtained from among the closing side limit values stored in the memory corresponding to respective positions of the focus detection areas.

The camera 1 according to the above-described embodiment is not particularly limited. The present invention may for example be applied to a digital video camera, a single lens reflex digital camera, a built-in lens type digital camera, a camera of a mobile phone, or other optical devices.

1 . . . digital camera
2 . . . camera body
21 . . . camera control unit
22 . . . imaging device
221 . . . imaging pixel
222a, 222b . . . focus detection pixel
28 . . . operating unit
3 . . . lens barrel
32 . . . focus lens
36 . . . focus lens drive motor
37 . . . lens control unit

What is claimed is:

1. A focus adjustment apparatus configured to detect a focal state in a first focus detection area and in a second focus detection area of a same shooting screen, the second focus detection area being different from the first focus detection area and closer to a center of the shooting screen than the first focus detection area,
the focus adjustment apparatus comprising:
a processor configured to operate as a camera control unit that (i) sets an aperture value of an optical system within a first range between a first aperture value and a second aperture value when a focal state is detected in the first focus detection area and (ii) sets the aperture value of the optical system within a second range between the first aperture value and a third aperture value when the focal state is detected in the second focus detection area, wherein:
the third aperture value is larger than the second aperture value, and
the second aperture value is larger than the first aperture value.

2. The focus adjustment apparatus as recited in claim 1, wherein
the second aperture value or the third aperture value is set on a basis of a position of the first focus detection area or the second focus detection area.

3. The focus adjustment apparatus as recited in claim 1, wherein
the camera control unit causes a focus lens included in an optical system to move using a detected focal state.

4. The focus adjustment apparatus as recited in claim 1, wherein the first aperture value is received from a lens barrel.

5. The focus adjustment apparatus as recited in claim 1, wherein
the camera control unit, if an imaging aperture value when capturing an image is larger than the third aperture value, detects a focal state within a range from the first aperture value to the second aperture value when the focal state is detected in the first focus detection area and detects a focal state within a range from the first aperture value to the third aperture value when the focal state is detected in the second focus detection area, and
the camera control unit, if the imaging aperture value is smaller than the first aperture value, sets an aperture value at the imaging aperture value when a focal state is detected in the first focus detection area or when a focal state is detected in the second focus detection area.

6. The focus adjustment apparatus as recited in claim 1, wherein
the camera control unit, if an imaging aperture value when capturing an image is a value between the first aperture value and the second aperture value, sets an aperture value of an optical system when performing focus detection within a range between the first aperture value and the imaging aperture value.

7. An imaging apparatus comprising the focus adjustment apparatus as recited in claim 1.

8. The imaging apparatus as recited in claim 7, further comprising an imaging device that has a plurality of pixels for focus detection.

9. The imaging apparatus as recited in claim 8, wherein the imaging device further has a plurality of pixels for imaging.

10. The imaging apparatus as recited in claim 8, wherein the focus adjustment apparatus is capable of performing focus detection of a phase difference detection system or focus detection of a contrast detection system on the basis of a signal output from the imaging device.

* * * * *